No. 12,779. REISSUED APR. 14, 1908.
G. A. GOODSON.
PROCESS OF PLATING METALLIC BODIES.
APPLICATION FILED NOV. 24, 1905.
SPECIMENS.
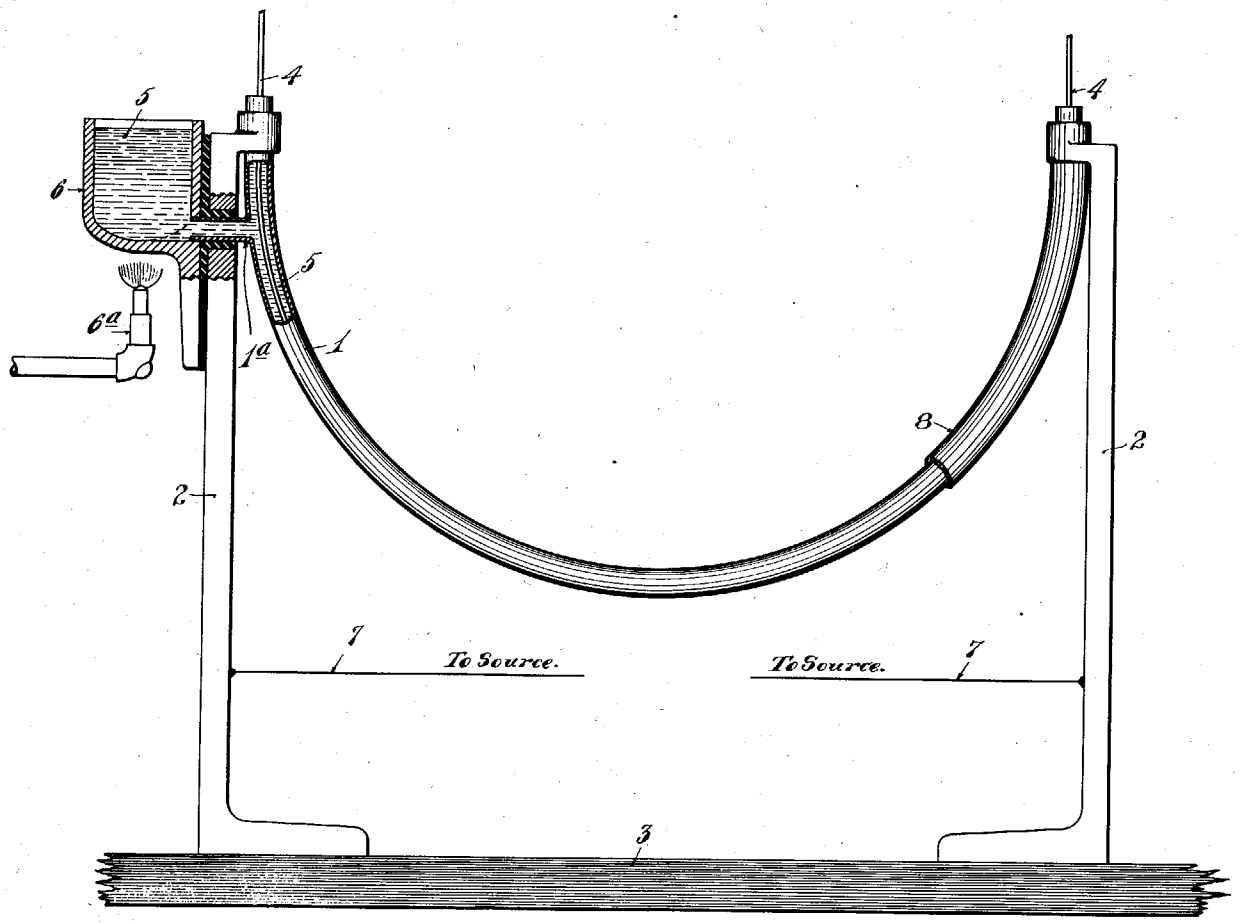
Witnesses.
E. W. Jeppson.
H. D. Kilgore.
Inventor:
George A. Goodson.
By his Attorneys.
Williamson & Merchant

UNITED STATES PATENT OFFICE.

GEORGE A. GOODSON, OF MINNEAPOLIS, MINNESOTA, ASSIGNOR TO GOODSON ELECTRIC GALVANIZING COMPANY, OF MINNEAPOLIS, MINNESOTA, A CORPORATION OF MINNESOTA.

PROCESS OF PLATING METALLIC BODIES.

No. 12,779. Specification of Reissued Letters Patent. Reissued Apr. 14, 1908.

Original application filed March 31, 1904, Serial No. 200,913. Divided and application filed June 9, 1904, Serial No. 211,745. Original Patent No. 789,690, dated May 9, 1905. Application for reissue filed November 24, 1905. Serial No. 288,981. (Specimens.)

*To all whom it may concern:*

Be it known that I, GEORGE A. GOODSON, a citizen of the Dominion of Canada, residing at Minneapolis, in the county of Hennepin and State of Minnesota, have invented certain new and useful Improvements in Processes of Plating Metallic Bodies; and I do hereby declare the following to be a full, clear, and exact description of the invention, such as will enable others skilled in the art to which it appertains to make and use the same.

This application is filed as a division of my original application Serial No. 200,913, filed by me March 31, 1904, entitled "Process and apparatus for galvanizing, tinning and otherwise plating wire and other metallic bodies."

My invention has for its object to provide an improved process of galvanizing, tinning or otherwise plating wire and other metallic bodies; and to this end my invention or discovery consists of the novel process hereinafter described and defined in the claims.

The old process which has hitherto been generally employed in galvanizing and tinning wire may be summarily stated as follows: The zinc or tin used in plating the wire is kept in molten condition in large trough-shaped kettles suitably mounted for the direct application thereto of flames from burning fuel, and the wire is drawn through the large body of molten plating metal contained in said kettles. To effect good plating the molten plating metal must be kept substantially at a predetermined temperature, and the submerged portion of the wire being drawn therethrough must be brought to substantially the same temperature as the molten plating metal. The wire of course is of higher fusibility than the plating metal and will not be melted, but will remain intact. In carrying out said old process it has been found that considerable time is required to heat the wire to the temperature of the molten plating metal. Hence the greater the length of the kettles containing the molten plating metal the more rapidly the wire may be drawn therethrough, and, conversely, the slower the movement of the wire the shorter the kettles may be. It is equally evident that the longer and more bulky the kettles the more space is required for the same and the greater is the amount of heat required to maintain such a large body of plating metal in molten condition at the proper temperature, and, on the other hand, a slow movement of the wire, as required when the kettles are short, is wasteful of time. As a compromise between the two plans above noted it has in practice been found advisable to employ kettles of about twelve feet in length and to draw the wire through the molten metal at the rate of about seventy-five feet per minute. This seems to be about the best result in point of capacity which can be secured. Under these conditions it will be seen that a large amount of space is taken up by the kettles, that a large quantity of fuel is required to keep the plating metal at the proper temperature, and that the wire can only be drawn through the molten plating metal at a comparatively slow rate of speed. Moreover, much labor and attention is required to maintain the fires and reliably to control the temperature of the molten plating metal so as to get the best results in the quality of the plating, for it is a well known fact that comparatively slight variation in the temperature of the molten plating metal either above or below the predetermined proper temperature will result in poor plating, or it may be, if the variation be considerable, that the wire will not be plated at all. Another serious objection to the old process is the fact that such a large body of the molten plating metal must be exposed to the atmosphere, thereby producing a large waste from the resulting oxidation.

My improved process herein disclosed and claimed is a radical departure from the old process above summarized and overcomes many of the objections above noted, securing greatly increased product per unit of time, a better quality of product, and a saving in the amount of plating metal consumed.

In my practice up to the date of this writing I have electrically excited contacting surfaces of the plating metal and the wire or other metal to be plated, securing thereby highly satisfactory results, in respect to the quality of the plating, the product per unit of time, and the amount of plating metal consumed. So far I have got the best results by submerging the wire or other metal to be plated in an attenuated body of molten plating metal, with both thereof subject simultaneously to an electric current, or, otherwise stated, the molten metal has been held in tubes of small caliber, the wire has been drawn therethrough under a continuous movement, and a current of electricity has simultaneously been passed through the molten plating metal and through that portion of the wire which is submerged therein.

The accompanying drawing illustrates one form of apparatus which I have found to be well adapted for carrying out my new process above stated.

In the single view of said drawing, the numeral 1 indicates a curved pipe or tube of relatively small caliber composed of iron or other suitable material. As shown, the tube 1 is of approximately semicircular form and is supported with its open ends upward and is supported by a pair of metallic pedestals 2, electrically connected therewith. The pedestals 2 are shown as fixed to a base 3 of insulating material, such as a wooden sill or floor. The said pipe or tube 1 affords an attenuated conduit open at its ends and through which the wire 4 may be drawn, and is adapted to hold or maintain around that portion of the wire being drawn therethrough an attenuated or thinly-drawn-out body of molten plating metal 5. Said molten plating metal 5 may be supplied to the plating tube 1, so as to keep the tube filled to the proper height, in any suitable way. I have shown for the purpose a small melting pot or kettle 6, subject to the flames of a gas burner 6[a] and connecting with the plating tube 1 by a small supply pipe 1[a]. The melting pot 6 should be insulated from the supporting-standard 2.

The numerals 7 represent conductors connecting standards 2, the plating tube 1, the molten metal 5 within the tube 1, and the submerged portion of the wire 4 into an electric circuit supplied with current from any suitable source. The tube 1 should be covered with a wrapping 8 of asbestos or other heat-insulating material.

With the apparatus above described it is obvious that the plating metal 5 and the wire 4 submerged therein, may be heated to a common temperature by the current supplied thereto. The current of course is properly regulated for maintaining the molten plating metal and the wire to be plated at the exact desired temperature for the best results. The wire 4 may be drawn through the tube 1 by hand or by any suitable mechanical devices.

It will be seen that under this process and with the form of apparatus above described the amount of the plating metal which must be necessarily kept in a molten condition and at the required predetermined temperature for the best results in plating is reduced to a minimum, and hence it follows that by the application of the proper electric current this small attenuated body of plating metal may be quickly brought to the required temperature coincidently with the corresponding heating of the wire, and be there maintained while the wire is being drawn through under a continuous movement. It is further obvious that the attenuated body of molten plating metal is protected from the atmosphere, except only at the open ends of the tube 1, and this, if desired, can be reduced to an opening of substantially the same diameter as the wire itself, or be fitted with a gland, so as to exclude the air entirely from the plating tube 1, and hence it follows that the oxidation of the molten metal is reduced to a minimum and may be said to be almost entirely eliminated.

From my experience in the practical application of my process of plating metallic bodies herein disclosed, it seems clear that the molten plating metal which has been subjected to an electric current of the proper strength and for the proper length of time, becomes changed in condition so that, when the metallic body is submerged in a molten bath of plating metal so electrically treated, the plating metal will firmly unite with the metallic body to be plated. Just exactly what the change is in the molten plating metal thus subjected to an electric current, I am unable to state; but what I do know is that I get a plating or coating which so firmly unites to the wire or other body to be plated that it seems to be an amalgamation of the plating metal with the surface portion of the body to be plated.

As an illustration of the preferred conditions of practice of my invention, I may state that where the plating metal employed is, for instance, lead, and the internal diameter of the tube or conduit 1 is say three quarters of an inch, the current employed for maintaining the lead in the tube or conduit in the molten condition will in general be a current of from 1500 to 2,000 amperes applied for from twelve to fifteen hours. It will, of course, be understood that, in all cases, the metal to be plated, whether with zinc, tin or lead, is to be subjected to the usual preliminary pickling operations, familiar to those skilled in the art, and which need not, therefore, be set forth in full herein.

Of course I do not limit myself to any special form of apparatus for carrying my process into effect. Apparatus capable of doing the work may take a considerable range in diversity of forms and construction. For example, I have disclosed in my pending application Serial No. 209,993, filed April 7, 1904, an apparatus within the principle of the apparatus herein disclosed in a broad point of view, but embodying numerous additional features better adapting the same for the commercial utilization of my new process herein disclosed and claimed.

In practice it has been found that this process gives highly satisfactory results with the use of lead as the plating metal. These results consist in the production of a firmly-adhering non-scaling coating of the lead upon the metal to be plated, which, so far as I know, has not been commercially practicable under any hitherto known processes.

So far as I know the process herein disclosed is a pioneer invention or discovery of large practical utility and value, and I desire to claim the same herein in the broadest possible way.

What I claim and desire to secure by Letters Patent of the United States, is as follows:

1. The process of plating wire or other metal, which consists in bringing the same into contact with molten plating metal, and in electrically exciting contacting surfaces of the molten plating metal and the metal to be plated.

2. The process of plating wire or other metallic bodies, which consists in submerging the same in a bath of molten plating metal, and in passing a current of electricity through the plating metal and the metal to be plated.

3. The process of plating wire or other metallic bodies, which consists in maintaining an attenuated body of plating metal around a portion of the metal to be plated, and in passing an electric current through said attenuated body of plating metal and the submerged portion of the metal to be plated, substantially as described.

4. The process of plating wire or other metallic bodies, which consists in drawing the same, under a continuous movement, through an attenuated body of plating metal, and in passing an electric current simultaneously through the plating metal and the metal to be plated, substantially as described.

5. The process of electroplating, which consists in submerging the metal to be plated in a bath of molten plating metal, and subjecting both to an electric current, with the metal to be plated, and the molten plating metal, connected up in multiple, in a common electric circuit.

6. The process of plating wire or other metallic bodies, which consists in subjecting molten plating metal to an electric current and in applying the molten plating metal to the wire or other metallic body to be plated.

7. The process of plating wire or other metallic bodies with lead, which consists in subjecting molten lead to an electric current until its condition has been so changed that it will firmly unite with the body to be plated, and applying the lead in molten condition to the wire or other metallic body to be plated.

8. A metallic body plated with electrically treated molten metal.

9. A metallic body plated with electrically treated molten lead.

In testimony whereof I affix my signature in presence of two witnesses.

GEORGE A. GOODSON.

Witnesses:

MALIE HOEL,

FRANK D. MERCHANT.